April 29, 1924.
W. HOLM ET AL
FOLDABLE SLED
Filed Jan. 26, 1923
1,492,097
2 Sheets-Sheet 2
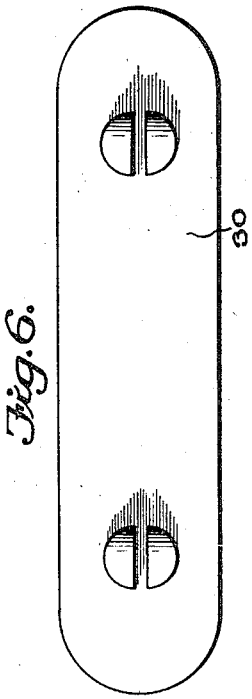
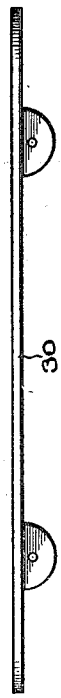
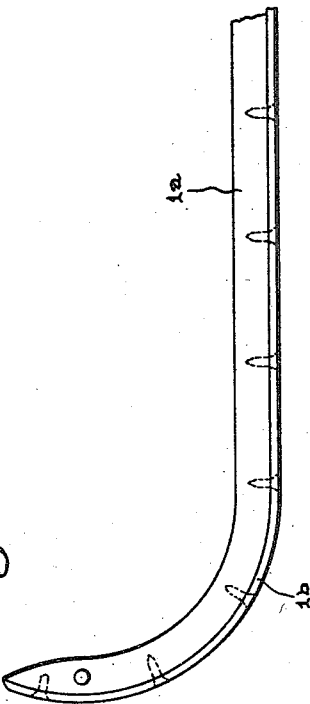
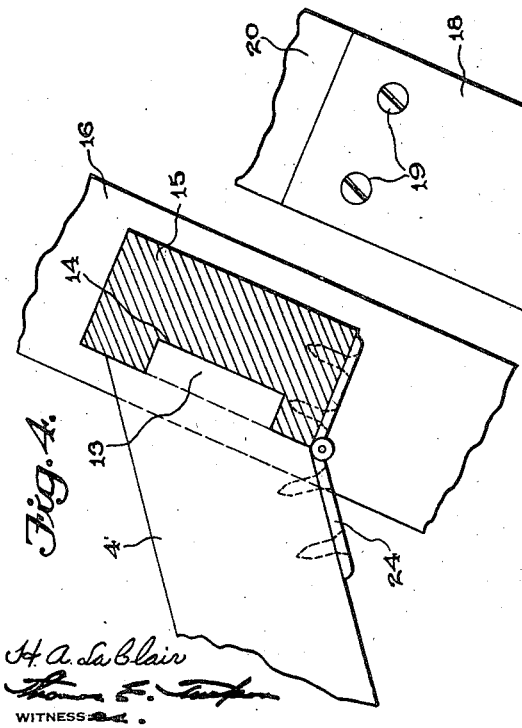
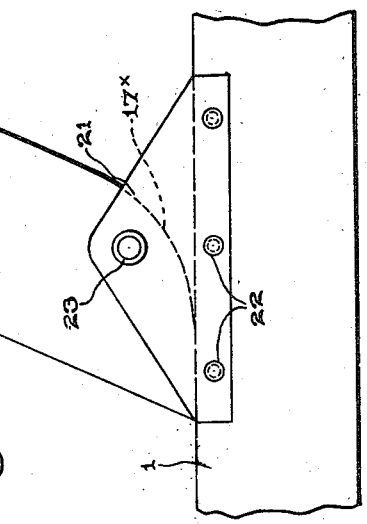
Warner Holm
George Ekman
INVENTOR
BY Victor J. Evans
ATTORNEY Patented Apr. 29, 1924.

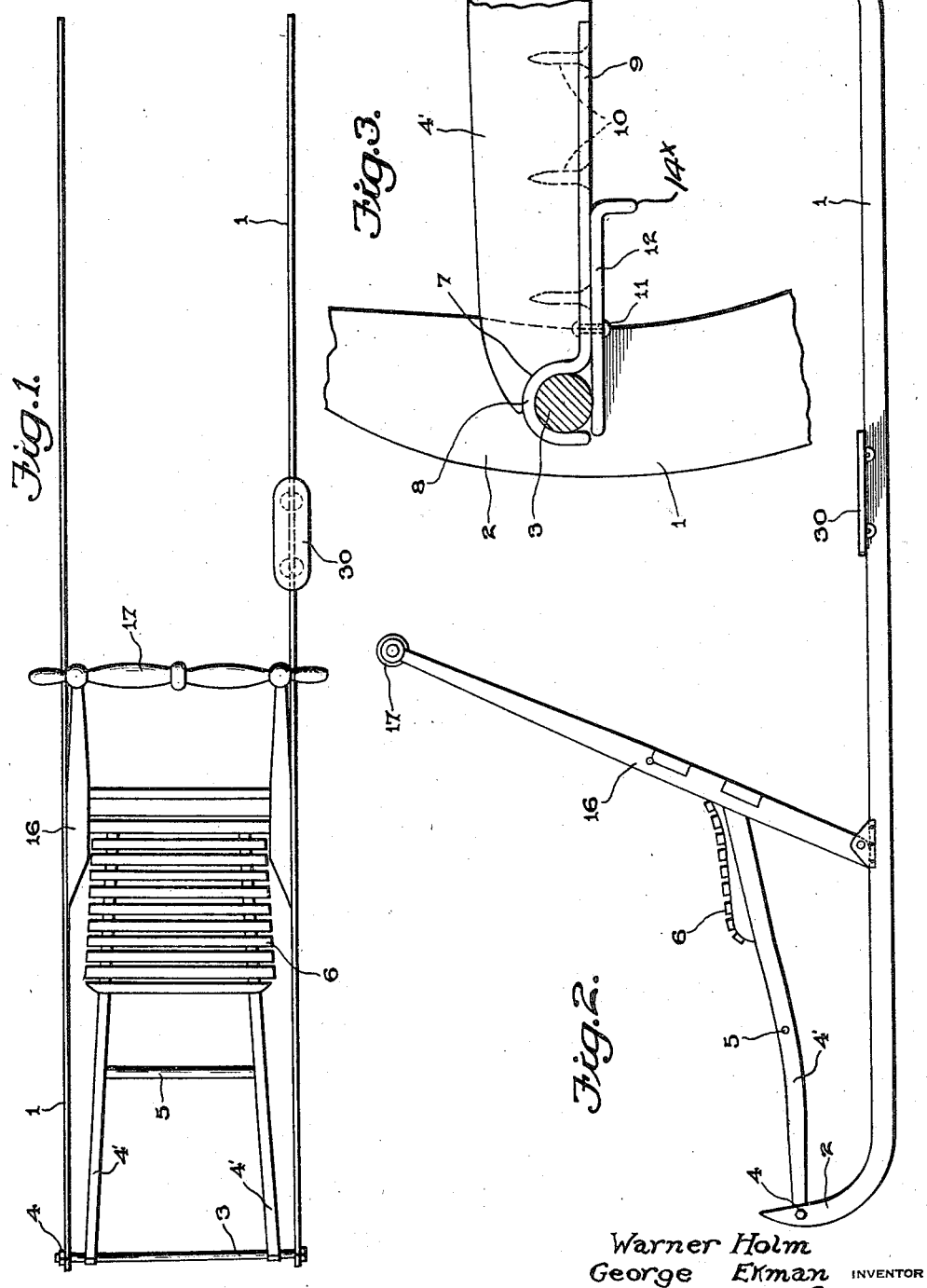

1,492,097

UNITED STATES PATENT OFFICE.

WARNER HOLM AND GEORGE EKMAN, OF KEARNY, NEW JERSEY.

FOLDABLE SLED.

Application filed January 26, 1923. Serial No. 615,039.

*To all whom it may concern:*

Be it known that we, WARNER HOLM and GEORGE EKMAN, respectively, a citizen of the United States and a subject of the King of Sweden, residing at Kearny, in the county of Hudson and State of New Jersey, have invented new and useful Improvements in Foldable Sleds, of which the following is a specification.

The object of our said invention is the provision of a foldable sled of simple, strong and easily manipulated construction whereby the sled can be expeditiously and easily folded into small compass for carriage or storage, and whereby the sled can as readily be set up and secured in rigid manner for use.

To the attainment of the foregoing, the invention consists in the improvement as hereinafter described and definitely claimed.

In the accompanying drawings, forming part of this specification:—

Figure 1 is a top plan view of the sled constituting the preferred embodiment of our invention.

Figure 2 is a side elevation of the sled.

Figures 3, 4 and 5 are enlarged detail views hereinafter explicitly referred to.

Figures 6 and 7 are detail views of the foot plate hereinafter described in detail.

Figure 8 is a detail view showing a portion of a modified runner.

Similar numerals designate corresponding parts in Figures 1 to 7 to which reference will first be made.

Among other elements our novel sled comprises two runners 1, spaced apart in parallelism. The said runners 1 are preferably of steel and are possessed of resiliency and are provided with upturned forward end portions 2. Extending through and between the said runner portions 2 at about the height illustrated is a transverse rod 3, the end portions of which are threaded to receive nuts 4 which are disposed at the inner and outer sides of the runner portions 2 as shown in Figure 1.

In addition to the runners 1 and the said transverse rod 3, the sled comprises bars 4', connected together in rigid manner by a transverse rod 5, and designed to support a seat 6. In this connection it is to be understood that when desired the seat 6 may be equipped with appropriate means to secure a child thereon. We do not, however, illustrate the said means inasmuch as it per se is not of our invention.

The bars 4' may be and preferably are of wood, and the forward ends thereof are recessed as indicated by 7. In the said recesses 7 of the bars 4 are disposed hooks 8 at the forward ends of plates 9 that are fixed to the bars 4 at the undersides thereof by screws 10 or other appropriate means. The said hooks 8 are adapted to straddle the transverse rod 3 in the manner best shown in Figure 3 so as to strongly connect the bars 4 to the rod 3. Pivotally connected at 11 to the plates 9 are fasteners 12 with pendent finger pieces 14$^x$ at their rear ends. Manifestly when each of the fasteners 12 is in the position shown in Figure 3 the bars 4' are strongly and securely connected to the transverse rod 3 without liability of casual disconnection. When, however, the fasteners 12 are swung to positions at right angles to that shown in Figure 3, the hooks 8 can be readily lifted off the transverse rod 3 and in that way the bars 4' can be disconnected from the rod 3 so as to permit of the sled being folded into small compass. The rear ends of the bars 4' are provided with projections 13 best shown in Figure 4. When the sled is set up for use the said projections 13 are disposed snugly in recesses 14 in a cross bar 15 fixed to handle bars 16, the said handle bars 16 being connected together at their upper ends by a transverse bar or portion 17 preferably shaped as shown in Figure 1 so as to enable the operator of the sled to take secure hold thereof. The lower ends of the handle bars 16 are rounded as designated by 17$^x$ and best shown by dotted lines in Figure 5. It will also be understood that the lower portions 18 of the bars 16 are of steel, the said portions 18 being fixedly connected by screws 19 or other appropriate means to the upper portions 20 which together with the transverse portion 17 are preferably of wood. Standards 21 are fixedly connected at 22 to the runners 1 and are disposed at opposite sides of the said runners 1 so as to receive between them the handle bar portions 18 which are pivotally connected to the standards 21 as designated by 23. The lower rounded portions of the handle bar portions 18 render it feasible to swing the handle bars rearwardly and downwardly against and parallel to the upper edges of the runners 1. The seat supporting bars 4' are hinged at 24 to the cross-bar 15 of the handle bars 16, Figure 4, and from this it follows that when the seat carrying bars 4' are disconnected from the transverse rod 3, and the handle bar 16 are swung rearwardly and downwardly on the runners 1, the bars 4' and the seat 6 carried thereby can be swung to a position between the handle bar 16 and also between the runners 1 so that the sled will be reduced to small compass for convenient carriage under the arm or for storage or shipment in a small space.

Superimposed upon one of the runners 1, preferably the left hand runner 1 is a plate 30. Said plate 30 is designed to afford a rest for the left foot of an operator, and it may be connected to the mentioned runner 1 in any approved manner without affecting our invention. We prefer, however, to provide the said plate 30 with pendent apertured lugs disposed at opposite sides of the runner and connected thereto by transverse rivets or bolts.

When our novel sled is unfolded and secured in working state by the locking of the bars 4' to the transverse rod 3, a child or adult to be carried is disposed on the seat 6, and the operator stands on the plate or platform 30 with his left foot and uses his right foot to engage the snow or ice covered surface with a view to propelling the sled. In this connection it will be understood that the operator grasps the portion 17 at the upper ends of the handle bars 16; also, when deemed expedient the right shoe of the operator can be equipped with a calk so as to more positively engage the snow or ice covered surface to be traversed by the sled. Incident to the operation of the sled it will be understood that the same can be conveniently steered by twisting the runners.

When desired the runners instead of being formed entirely of steel may each be formed partly of wood and partly of steel as shown in Figure 8, the wooden major portion of the runner shown in said figure being designated by $1^a$, and the steel shoe secured to the underside of the major portion $1^a$ being designated by $1^b$.

Notwithstanding the practical advantages of our novel sled set forth in the foregoing, it will be noted that the sled is simple and inexpensive in construction and is well adapted to withstand the usage to which devices of corresponding character are ordinarily subjected.

We have entered into a detailed description of the construction and relative arrangement of the parts embraced in the present and preferred embodiments of our invention in order to impart a full, clear and exact understanding of the said embodiments. We do not desire, however, to be understood as confining ourselves to the specific construction and relative arrangement of parts inasmuch as in the future practice of the invention various changes and modifications may be made such as fall within the scope of our invention as defined in our appended claim.

Having described our invention, what we claim and desire to secure by Letters Patent, is:—

A foldable sled comprising runners having upwardly disposed forward portions and a transverse rod therebetween, handle bars hingedly connected to the runners, bars hingedly connected with the handle bars and provided with a seat and having recesses in their undersides at their forward ends, plates fixed to the undersides of said bars and having hooks disposed in said recesses and adapted to straddle the transverse rod between the runners, and fasteners pivoted at intermediate points thereof to the plates and movable to and from positions below the said transverse rod and having rear pendent finger pieces.

In testimony whereof we affix our signatures.

WARNER HOLM.
GEORGE EKMAN.